April 9, 1940.   E. L. WIEDMAN   2,196,715
TRAILER JACK OR SUPPORT
Filed April 7, 1939   2 Sheets-Sheet 1
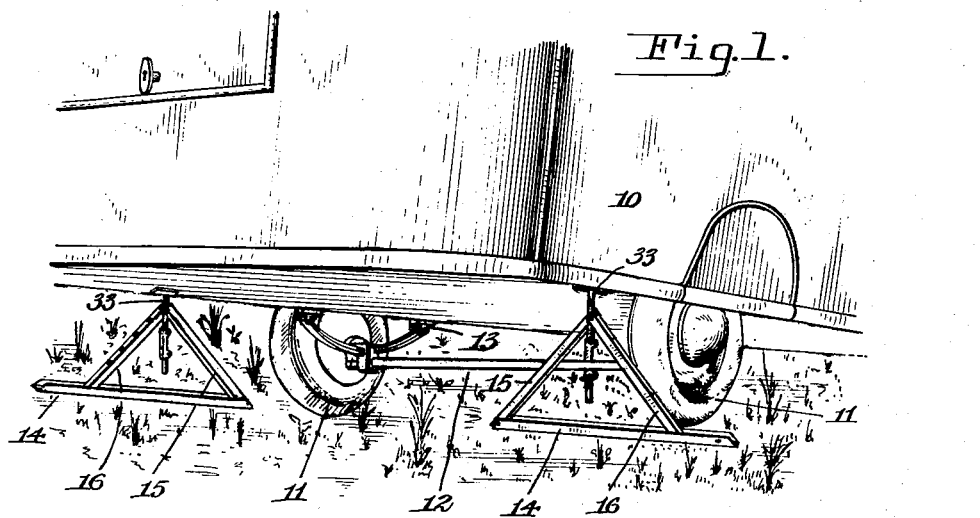
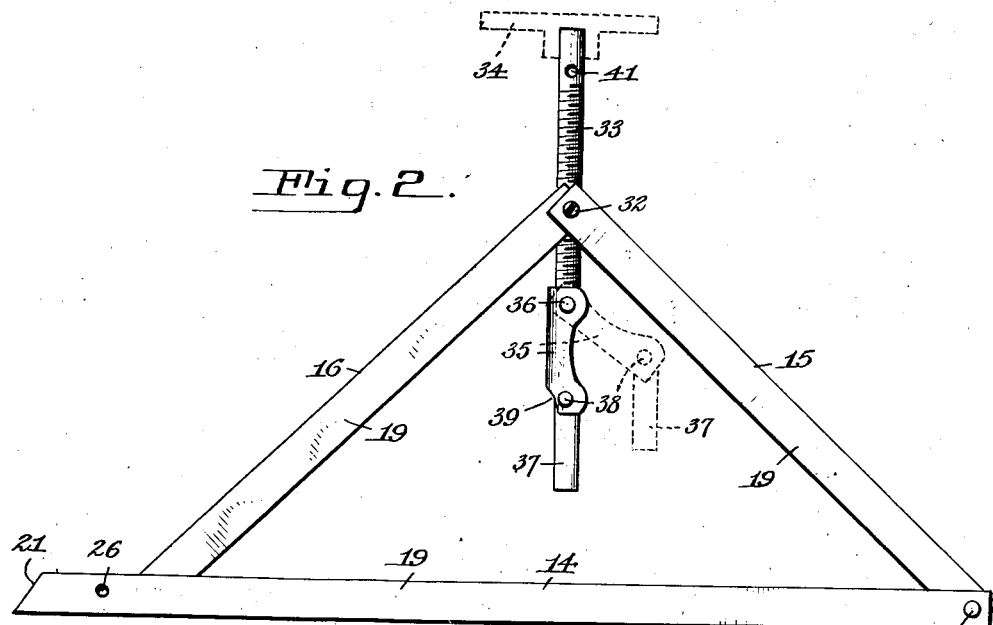
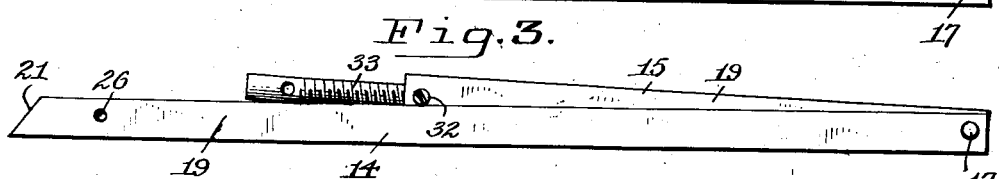
Edward L. Wiedman,
Inventor.
By Emil Neubart
Attorney

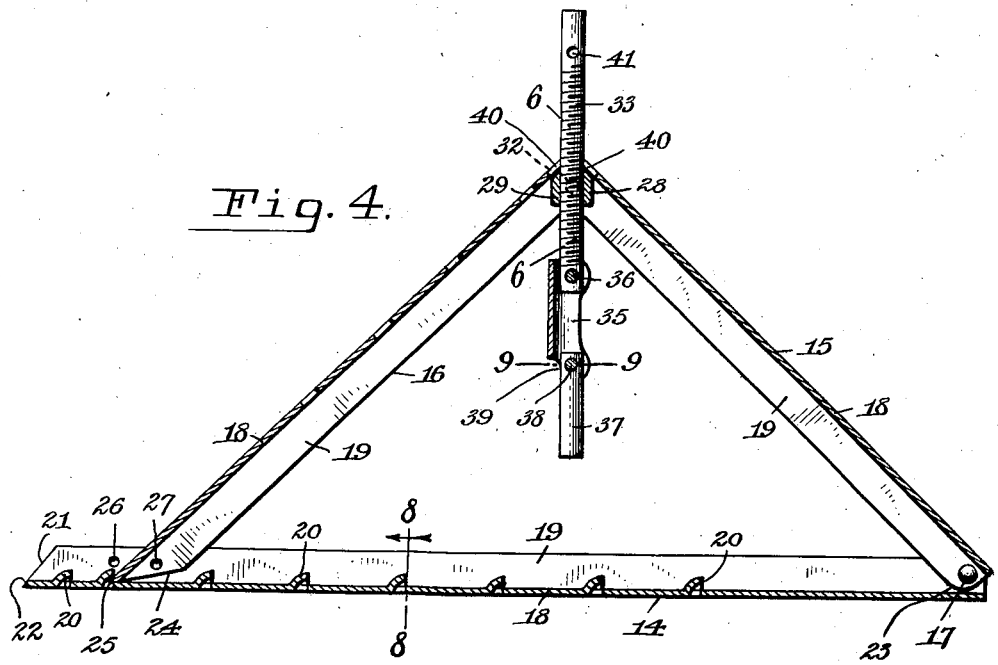

Patented Apr. 9, 1940

2,196,715

UNITED STATES PATENT OFFICE 2,196,715

TRAILER JACK OR SUPPORT

Edward L. Wiedman, Tonawanda, N. Y.

Application April 7, 1939, Serial No. 266,577

10 Claims. (Cl. 254—126)

My invention relates to a jack for trailers; it being particularly designed for leveling trailers when stops are made or for jacking up the trailer in the event that repairs to or change of tires are necessary.

It is the purpose of my invention to provide a convenient and easily operated jack of the type mentioned, whereby on parking a trailer for overnight or longer stops, the floor of the trailer can be easily leveled, regardless of the slope of the ground on which the trailer is stopped, within reasonable bounds of course, so that the occupants may have the assurance of ease in walking about within the trailer, and at the same time be assured of a solid foundation for the trailer.

It is another object of my invention to provide jacks of this kind which will prevent lateral and endwise movement of the trailer in that a pair of jacks may be placed underneath the trailer to support the body of the same while they are positioned at a right angle to each other.

A further object of my invention is to provide jacks of this type which include means for preliminarily adjusting the jack to approximately the distance between the body and the ground or other surface on which the trailer rests, and in providing easily manipulated means for elevating the body portion of the trailer, particularly in rear of the traction wheels, so that the floor of the trailer can be easily set on a level keel, while assuring a solid foundation which will guard against rotation of the traction wheels and consequently movement of the trailer.

A further object of my invention is to provide a jack of this kind which can be used in pairs so that individual adjustment of the jacks may be made which may vary considerably and thus assure a safe support for the trailer body on uneven or hilly ground.

While my improved jack is used mainly as a supporting jack, its construction permits of use in the same manner as an ordinary jack, so that tire changes or wheel adjustments can be made.

With the above and other objects in view to appear hereinafter, my invention consists in the novel features of construction and in the arrangement and combination of parts to be hereinafter described and more particularly pointed out in the subjoined claims.

In the drawings:

Fig. 1 is a perspective view of the rear lower portion of a trailer, showing the same supported by means of my improved jacks.

Fig. 2 is a side elevation of one of the jacks in unfolded or expanded position, showing one of the many adjustments of the device.

Fig. 3 is a side view showing the jack folded.

Fig. 4 is a longitudinal section through the jack.

Fig. 5 is a top plan view of the jack as shown in Figs. 2 and 4.

Fig. 6 is an enlarged vertical section taken on line 6—6, Fig. 4.

Fig. 7 is a detached perspective view of the jack screw, the articulated handle for operating the same, and the associated screw block or nut through which the jack screw is passed.

Fig. 8 is an enlarged transverse section through the base of the jack taken on line 8—8, Fig. 4, looking in the direction of the arrow crossing said line.

Fig. 9 is an enlarged transverse section taken on line 9—9, Fig. 4.

Referring to the drawings in detail, the numeral 10 designates the body of the trailer, which latter is of the conventional type to be attached at its front end to an automobile and supported at a distance from its front end by traction wheels 11, connected together in the usual manner by means of an axle 12, and spring-supported as shown at 13.

Trailers of this type require some means for supporting the same, particularly when detached from the automobile, and for this purpose I have provided my improved jack which comprises certain advantages that come into play when used in pairs, in addition to advantages which each jack possesses regardless of the use of another like jack in connection therewith.

As clearly shown in the drawings, my improved jack comprises an elongated base 14 and two upwardly converging sustaining legs 15, 16 associated therewith so that in the main the jack is of triangular formation when in use. The legs 15 and 16 are of approximately equal length, and they are adjustable on the base, which forms a continuous bearing, so that the triangle formed thereby in conjunction with the base can be an equi-lateral triangle, an isosceles triangle, or even a triangle in which the base portion thereof is longer than the upwardly diverging legs; but in all cases a substantially balanced triangle is provided by reason of the weight carried thereby being directly applied to the apex of the triangle, with the results that the weight is carried or distributed evenly along the two sustaining legs.

This equally distributed or balanced effect results from the fact that the apex, regardless of the adjustment of the sustaining legs, is always in a vertical plane centrally between the lower ends of the legs. In preferred construction the base 14 and the legs 15 and 16 are of channel formation in cross section which enables the jack to be folded compactly for the purpose of storing the same within the trailer when the jack is not in use, as will more clearly appear hereinafter.

One of the legs, that designated 15 in the drawings, is pivotally secured at its lower end to one end of the elongated base 14, as at 17, and the upper ends of these legs are pivotally connected together in a manner to be presently described, to enable the legs to be adjusted on the base 14 with a view of determining the distance between the latter and the apex of the triangular jack formed by said legs and the base.

The base and the legs form the three main parts of this improved jack, and each of which has a web 18 and flanges 19. The web 18 of the base is provided at regular or irregular intervals, as may be desired, with leg retainers or stops 20 which are formed by slitting the web transversely and bulging the metal forming the web upwardly or inwardly at one side of each of the slits. When adjusting the sustaining legs, the lower end of the leg 15 is engaged with one of the leg retainers or stops 20, and thus a rough adjustment of these legs is made and they are so retained due to the fact that the supporting structure comprised of the two sustaining legs, or as it may be termed the sustaining structure, is pivotally connected to the base at one point only. This entire sustaining structure can be swung on said pivot point. Thus both legs are moved together on the pivot, and regardless of the leg retainer or stop engaged by the sustaining leg 16, a triangular structure results therefrom with the angles more or less acute and the apex of the triangular structure either raised or lowered with respect to the base, but always positioned in a plane centrally between the lower ends of the two sustaining legs. Therefore, regardless of the adjustment made, the weight carried by the structure is definitely balanced in the direction of the length of the base. In other words, both sustaining legs retain the same angular relation to the base, in contradistinction to previous form of jacks in which one sustaining leg was at a greater angle to the base than the other.

The flanges 19 of the base 14 are beveled at the end opposite the pivot point 17, as at 21, and the corresponding end of the web portion 18 is likewise beveled, as at 22, so that this base when set on an uneven or hilly ground, digs into the ground and with the aid of the underside of the elongated web 18, assures a solid foundation for the trailer.

It is to be noted that the sustaining leg 16 is narrower than the base 14 and that the sustaining leg 15 is narrower than the sustaining leg 16; also that all flanges of the three members forming the triangular structure are directed inwardly. The lower end of the supporting leg 16 therefore fits between the flanges 19 of the base, and the ends of the flanges 19 of said leg are rounded, as at 23, to provide free pivotal movement for said end within the base. A like arrangement is provided at the upper end of the sustaining leg 15 which is fitted between the flanges 19 of the sustaining leg 16. The lower end of the leg 16 is cut at an angle, as at 24, so as to provide a somewhat sharpened end for the web portion of this leg, as shown at 25, and at the same time provide the necessary clearance between the web 18 of the base 14 and the flanges 19 of the sustaining leg 16 to enable any desired adjustment of said leg to be made along the base. Moreover, by providing a somewhat sharpened end for the web 18 of the sustaining leg 16, a more secure bearing is provided for the same against any of the selected leg retainers or stops 20 formed on the base. It is to be noted that the sustaining leg 15 has its lower end entered between the flanges 19 of the base and that this leg has a transverse dimension somewhat less than the distance between the flanges 19 of the base. However, after the lower end of the sustaining leg is brought into contact with any of the leg retainers or stops 20, lateral movement of this leg will not take place when any weight is carried by the triangular structure provided.

Although I have thus far described adjustable means of connection between the supporting legs and the base, there may be occasion when it is desired to have a fixed relationship between the base and the supporting legs, and for this purpose the flanges 19 of the base are provided with openings 26 and the flanges 19 of the sustaining legs 15 with openings 27. These openings may be brought into registration and a suitable pin be thrust transversely through both the sustaining leg and the base. Preferably these openings 26 are so positioned on the base that when such a fixed relationship is desired, the end of the sustaining leg 15 will be engaged with the outermost leg retainer or stop 20, the sustaining legs being at such time at their greatest spread. Whether an adjustable connection is provided between the supporting legs and the base, as shown in Fig. 4, or a fixed connection, such as would exist if a pin were thrust through the openings 26 and 27, the weight carried by the jack would always be equally distributed along said legs.

Thus far I have only referred to the pivotal connection between the upper ends of the two sustaining legs 15 and 16, this being accomplished by the use of a block or nut 28 fitted between the flanges 19 of the sustaining leg 15, as clearly shown in Fig. 6. This block or nut may be of any formation, but I have shown the same provided with a body portion 29 having bosses 30 at opposite sides thereof, and formed in this block or nut at opposite sides so as to open axially through the bosses 30, are screw-threaded bores 31 into which are threaded pivot-screws 32 which are passed through openings in the flanges 19 of both sustaining legs. As already stated herein, a rough adjustment of the jack can be made by simple adjustment of the sustaining legs 15 and 16 along the base, and in many instances this would serve the purpose, especially when the placing of the floor of a trailer on an even keel is not believed necessary. However, I have found it of advantage to employ in connection with the triangular structure, an adjusting or jack-screw 33 which is threaded through the block or nut 28, the latter being provided with a vertically disposed internally threaded bore for this purpose. The upper end of this jack-screw is adapted to engage the underside of the trailer body, and when rotating the screw after adjusting the sustaining legs to the approximate height desired, the trailer body will be lifted to any required degree, whereby assurance of an even keel for the floor of the trailer is had. If desired, a socketed plate or bearing accessory, such as indicated in dotted lines at 34, Fig. 2, may be fitted onto the upper end of the jack-screw, and thus a large bearing provided to engage the under side of the body portion of the trailer. In fact, any other type of bearing accessory may be placed on the jack, and I believe it to be within the skill of a mechanic to shape such an accessory to conform to the part of the trailer which the jack is to engage. In the event it is desired to use the jack for other purposes, such accessory will be shaped according to the particular element or part to be engaged.

For the purpose of conveniently rotating the jack-screw 33, either clockwise or counterclockwise, I prefer to secure to the lower end thereof an articulated crank which comprises a connector member 35 constructed of sheet-metal and formed into substantially U-shape in cross section so as to receive the lower end of the jack-screw 33 between the sides thereof at their upper ends, a pivot 36 being passed through said sides and the jack-screw to permit this bearing member to assume various angular positions with respect to the jack-screws, one of which is illustrated in dotted lines in Fig. 2. And, in connection with this connector member I employ a handle member 37 preferably in the form of a cylindrical rod or tube which fits with its upper end between the sides of the connector member at their lower end and is connected thereto by a pivot 38 passed through said sides and the upper or inner end of said handle member. This handle member is therefore free to swing with respect to the connector member 35 and assume any angle with reference thereto. To admit of this, the closed side of the connector member 35 is cut away, as at 39.

Attention is also invited to the fact that where required, the jack-screw and swivel or pivot block or nut 28 carrying the same may be swung in the direction of the longitudinal axis of the supporting legs, this being found of advantage when collapsing the jack, as will be hereinafter described. For this purpose the upper ends of both supporting legs 15 and 16 are notched or cut away through a portion of their width, as at 40, thus permitting the entire pivot or swivel assembly, comprising the swivel or pivot block or nut 28, the jack-screw 33, and the articulated handle at the lower end of the latter, to be swung into the supporting leg 15 preparatory to closing the jack. This is accomplished after moving the pivot or swivel assembly into the sustaining leg 15, then swinging the leg 16 into the leg 15, and finally swinging the nested legs into the base 14. As shown in the drawings, the heads of the pivot screws 32 project from the outer sides of the flanges 19 forming part of the sustaining leg 16, and therefore upon closing or folding the jack, these heads engage the upper edges of the flanges 19 on the base 14. So folded, the entire structure takes up practically no more space than that which the base alone would require when storing the jack within the trailer.

While I have found it preferable to provide projecting heads on the pivot screws 32, these screws may have countersunk heads, in which case the nested sustaining legs could be swung entirely into the base and absolutely no additional space for storage would be required than would be necessary for storing the base alone.

When using my improved jack in pairs, they are employed as illustrated in Fig. 1 of the drawings, one being disposed transversely while the other is disposed longitudinally. In this manner both lengthwise and lateral movement of the trailer is definitely obviated, and thus assurance is had that the trailer will be retained in a fixed position, enabling occupants of the same to move about with perfect freedom, and with definite assurance of complete stability.

My improved jack is also utilizable in the same manner as an ordinary jack, in that the trailer body may be elevated to such a point that it will carry the traction wheel or wheels upwardly and free them from contact with the ground, thereby enabling a tire to be removed for replacement or repairs. For this purpose, however, I find it of advantage to provide the jack-screw 33 with a transverse opening 41 near its upper end, and in any case beneath the socketed plate 34 or other accessory used; and by means of a bar or rod having one end thereof inserted into said opening, the necessary leverage will be provided for easily rotating the jack-screw, regardless of the weight carried thereby. This rod or bar may also be employed for positioning the trailer body when it is found necessary to park upon a hilly surface. However, under ordinary conditions, the articulated crank pivotally connected to the lower end of the jack-screw, will serve to adjust the trailer body and retain it in a rigid manner.

Having thus described my invention, what I claim is:

1. A jack for trailers and the like, comprising a triangular structure including an elongated base serving as a continuous bearing and two converging supporting legs extending upwardly from the base and receiving support therefrom, said supporting legs being connected together at their upper ends to form the apex of the triangular structure, at least one of said supporting legs being fixedly secured to said base, and a jack-screw adjustably threaded through said structure at the apex thereof, said supporting legs being foldable and movable together into a position substantially parallel with said base.

2. A jack for trailers and the like, comprising a triangular structure including an elongated base serving as a continuous bearing and two converging supporting legs extending upwardly from said base and connected together at their upper ends to form the apex of the triangular structure, said supporting legs receiving support from and having their lower terminals connected together by said base, and a vertically disposed jack-screw at the apex of said triangular structure provided with an operating crank at its lower end.

3. A jack for trailers and the like, comprising a triangular structure including an elongated channel-shaped base serving as a continuous bearing and two converging channel-shaped supporting legs extending upwardly from the base with their lower ends entered in the channel of the base and their upper ends connected together pivotally to form the apex of the triangular structure, said supporting legs receiving support from and being relatively adjustable along said base while maintaining their connection at the apex thereof, a jack-screw vertically disposed and extending through the apex of said triangular structure, and an articulated crank secured to the lower end of said jack-screw within said triangular structure, said converging legs being inclined downwardly in opposite directions to like degrees from the apex of said triangular structure to assure equal distribution thereon of the weight carried by said jack.

4. A foldable jack for trailers and the like, comprising a triangular structure including an elongated base serving as a continuous bearing and two converging channel-shaped supporting legs extending upwardly from the base and pivotally connected together at their upper ends, one of said supporting legs being pivotally connected at its lower end to one end of said base and the other being adjustably retained at its lower end against said base so that the apex of said triangular structure may be raised or lowered according to the adjustment made of said last-mentioned supporting leg, a block pivotally mounted in the channeled portion of said last-mentioned supporting leg at the apex of said triangular structure so that said block may be maintained in vertical position regardless of the adjustment made, and a jack-screw threaded through said block.

5. A jack for trailers and the like, comprising a triangular structure including an elongated channel-shaped base serving as a continuous bearing and having a longitudinal series of stops formed thereon and two converging channel-shaped supporting legs extending upwardly from the base and pivotally connected together at their upper ends by means of a block within the channel of one of said supporting legs, the lower end of one of said supporting legs being pivotally secured to opposite flanges at one end of said base and the lower end of the other supporting leg being selectively engaged with any one of said series of stops, and a jack-screw threaded through said block and assuming a normally vertical position regardless of the adjustment of said supporting legs, said supporting legs being at all times at like inclinations at opposite sides of a plane passing axially through said jack-screw regardless of the adjustment of said supporting legs so as to distribute the weight carried by said jack evenly along both supporting legs.

6. A collapsible jack for trailers or the like, comprising three members arranged to form a triangle with the apex thereof at the upper end of the jack, said members being of channel formation in cross section and of differing widths so that one of said members may be collapsed between the flanges of another and both of said members collapsed between the third member, said members being connected and associated to increase or diminish the height of the triangle and to diminish or increase the width of the same at the base, and a jack-screw swivel-connected to two of said members at the apex of said triangle to permit the collapsing of said members and capable of being raised and lowered independent of the adjustment of said triangle.

7. A jack for trailers or the like, comprising a base member serving as a continuous bearing, two upwardly converging legs associated with said base to form a triangle therewith having the apex thereof at the top, said supporting legs being so associated with said base to enable the shape of the triangle to be varied for increasing or diminishing the height of the same and for increasing or diminishing the base of the same without altering the bearing surface of said base member, a swivel-block secured to the supporting legs at the apex of said triangle, a jack-screw threaded through said swivel-block, and means to permit of rotating said jack-screw.

8. A jack for trailers or the like, comprising a base serving as a continuous bearing, a pair of upwardly-converging supporting legs pivotally connected together at their upper ends, one of said legs being pivotally connected at its lower end to said base, and means for retaining the lower end of the other of said legs in any of a plurality of selected positions in contact with said base, said supporting legs having spaced-apart flanges at their upper ends with the upper ends of the flanges of one of said supporting legs fitting between the upper ends of the flanges of the other, a block fitted between the interfitted portions of the flanges of said supporting legs, pivots passed through said interfitted flange portions and entering said block from opposite sides, and a jack screw threaded through said block.

9. A foldable jack for trailers or the like, comprising a base serving as a continuous bearing and supporting legs converging upwardly from said base and connected together at their upper ends, said base and supporting legs forming a triangle having its apex at the top, a jack-screw adjustably arranged within the jack at its apex, an elongated element of U-formation in cross section receiving the lower end of said jack-screw and being pivotally connected therewith, and a handle inserted in the lower end of said elongated element and pivotally connected thereto.

10. A jack for trailers and the like, comprising a triangular structure including an elongated base and two converging supporting legs extending upwardly from the base and meeting at their upper ends to form the apex of the triangular structure, and a vertically-disposed jack-screw at the apex of said structure, said base connecting the lower terminals of said converging legs and the latter being inclined downwardly in opposite directions to approximately like degrees from the apex of said triangular structure to assure approximately equal distribution of the weight carried by said jack along said supporting legs.

EDWARD L. WIEDMAN.